(12) United States Patent
Lee et al.

(10) Patent No.: US 8,400,497 B2
(45) Date of Patent: Mar. 19, 2013

(54) METHOD AND APPARATUS FOR GENERATING STEREOSCOPIC FILE

(75) Inventors: Gun-Ill Lee, Seoul (KR); Jae-Yeon Song, Seoul (KR); Seo-Young Hwang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1227 days.

(21) Appl. No.: 12/206,443

(22) Filed: Sep. 8, 2008

(65) Prior Publication Data

US 2009/0066783 A1 Mar. 12, 2009

(30) Foreign Application Priority Data

Sep. 7, 2007 (KR) .............................. 2007-0091144
Feb. 14, 2008 (KR) .............................. 2008-0013705

(51) Int. Cl.
*H04N 13/04* (2006.01)
(52) U.S. Cl. .............................. 348/51; 348/42; 348/469
(58) Field of Classification Search .................. None
See application file for complete search history.

(56) References Cited

U.S. PATENT DOCUMENTS 5,767,898 A * 6/1998 Urano et al. .................... 348/43
7,782,937 B2 * 8/2010 Yun et al. ................. 375/240.01

OTHER PUBLICATIONS

ISO/IEC 14496-12. Information Technology—Coding of audio-visual objects. Part 12: ISO base media file format. ISO/IEC. 2004. First edition. 62 pages.*

* cited by examiner

*Primary Examiner* — Jeffrey R Swearingen
(74) *Attorney, Agent, or Firm* — The Farrell Law Firm, P.C.

(57) ABSTRACT

A method and apparatus for generating a stereoscopic file defined based on a conventional International Standardization Organization (ISO) based media file format. The apparatus includes an encoder encoding first video data and second video data that are included in three-dimensional (3D) video data; and a file generating unit arranging the encoded first video data and second video data according to the information of a stereoscopic file format including boxes that are selected from boxes included in a conventional International Standardization Organization (ISO) based media file format in order to store and generate the stereoscopic file, and generating the stereoscopic file.

14 Claims, 6 Drawing Sheets

300

| | | | | | | | description | |
|---|---|---|---|---|---|---|---|---|
| ftyp | | | | | | | file type and compatibility | ~301 |
| moov | | | | | | | container for all the metadata | ~303 |
| | mvhd | | | | | | movie header | ~305 |
| | trak | | | | | | container for an individual track or stream | ~307 |
| | | tkhd | | | | | track header | ~309 |
| | | mdia | | | | | container for the media information in track | ~311 |
| | | | mdhd | | | | media header | ~313 |
| | | | hdlr | | | | handler, declares the media (handler) type | ~315 |
| | | | minf | | | | media information container | ~317 |
| | | | | vmhd | | | video media header | ~319 |
| | | | | smhd | | | sound media header | ~321 |
| | | | | hmhd | | | hint media header | ~323 |
| | | | | nmhd | | | Null media header | ~325 |
| | | | | dinf | | | data information box | ~327 |
| | | | | | dref | | data reference box | ~329 |
| | | | | stbl | | | sample table box | ~331 |
| | | | | | stsd | | sample descriptions | ~333 |
| | | | | | sttc | | (decoding) time-to-sample | ~335 |
| | | | | | stsc | | sample-to-chunk | ~337 |
| | | | | | stsz | | sample sizes | ~339 |
| | | | | | stco | | chunk offset | ~341 |
| mdat | | | | | | | media data container | ~343 |

300

| | | | | | | | |
|---|---|---|---|---|---|---|---|
| ftyp | | | | | | file type and compatibility | ~301 |
| moov | | | | | | container for all the metadata | ~303 |
| | mvhd | | | | | movie header | ~305 |
| | trak | | | | | container for an individual track or stream | ~307 |
| | | tkhd | | | | track header | ~309 |
| | | mdia | | | | container for the media information in track | ~311 |
| | | | mdhd | | | media header | ~313 |
| | | | hdlr | | | handler, declares the media (handler) type | ~315 |
| | | | minf | | | media information container | ~317 |
| | | | | vmhd | | video media header | ~319 |
| | | | | smhd | | sound media header | ~321 |
| | | | | hmhd | | hint media header | ~323 |
| | | | | nmhd | | Null media header | ~325 |
| | | | | dinf | | data information box | ~327 |
| | | | | | dref | data reference box | ~329 |
| | | | | stbl | | sample table box | ~331 |
| | | | | | stsd | sample descriptions | ~333 |
| | | | | | sttc | (decoding) time-to-sample | ~335 |
| | | | | | stsc | sample-to-chunk | ~337 |
| | | | | | stsz | sample sizes | ~339 |
| | | | | | stco | chunk offset | ~341 |
| mdat | | | | | | media data container | ~343 |

FIG.2

| | | | | | | |
|---|---|---|---|---|---|---|
| ftyp | | | | | file type and compatibility | ~401 |
| pdin | | | | | Progressive download information | ~403 |
| moov | | | | | container for all the metadata | ~405 |
| | mvhd | | | | movie header, overall declarations | ~407 |
| | trak | | | | container for an individual track or stream | ~409 |
| | | tkhd | | | track header, overall information about the track | ~411 |
| | | tref | | | track reference container | ~413 |
| | | edts | | | edit list container | ~415 |
| | | | elst | | an edit list | ~417 |
| | | mdia | | | container for the media information in a track | ~419 |
| | | | mdhd | | media header, overall information about the media | ~421 |
| | | | hdlr | | handler, declares the media (handler) type | ~423 |
| | | | minf | | media information container | ~425 |
| | | | | vmhd | video media header, overall information (video track only) | ~427 |
| | | | | smhd | sound media header, overall information(sound track only) | ~429 |
| | | | | hmhd | hint media header, overall information (hint track only) | ~431 |
| | | | | nmhd | Null media header, overall information(some tracks only) | ~433 |
| | | | | dinf | data information box, container | ~435 |
| | | | | dref | data reference box, declares soure(s) of media data in track | ~437 |
| | | | | stbl | sample table box, container for the time/space map | ~439 |
| | | | | stsd | sample descriptions (codec types, initialization etc.) | ~441 |
| | | | | stts | (decoding) time-to-sample | ~443 |
| | | | | stsc | sample-to-chunk, partial data-offset information | ~445 |
| | | | | stsz | sample sizes (framing) | ~447 |
| | | | | stz2 | compact sample sizes (framing) | ~449 |
| | | | | stco | chunk offset, partial data-offset information | ~451 |
| | | | | co64 | 64-bit chunk offset | ~453 |
| | | | | stss | sync sample table (random access point) | ~455 |
| | ipmc | | | | IPMP Control Box | ~457 |
| mdat | | | | | media data container | ~459 |
| meat | | | | | metadata | ~461 |
| | hdlr | | | | handler, declares the metadata (handler) type | ~463 |
| | iloc | | | | Item location | ~465 |
| | iinf | | | | item information | ~467 |
| | xml | | | | XML container | ~469 |
| | bxml | | | | binary XML container | ~471 |
| | scdi | | | | stereoscopic camera and display infomration | ~473 |
| | svmi | | | | stereoscopic video media infomration | ~475 |

FIG.7

METHOD AND APPARATUS FOR GENERATING STEREOSCOPIC FILE

PRIORITY

This application claims the priority under 35 U.S.C. §119 (a) of an application filed in the Korean Industrial Property Office on Sep. 7, 2007 and assigned Serial No. 2007-91144, and on Feb. 14, 2008 and assigned Serial No. 2008-13705, the contents of each of which are hereby incorporated by reference.

BACKGROUND OF THE INVENTION

1. Field of the Invention

The present invention generally relates to a method and apparatus for generating a stereoscopic file.

2. Description of the Related Art

Conventionally, standards for a file format used to store a two-dimensional (2D) image have been known, whereas a standard for a file format used to store a three-dimensional (3D) stereoscopic image has not yet been known.

In general, the Moving Picture Experts Group (MPEG), which is an international standardization organization related to multimedia, has been standardizing MPEG-2, MPEG-4, MPEG-7 and MPEG-21, since its first standardization of MPEG-1 in 1988. As a variety of standards have been developed in this way, a need to generate one profile by combining different standard technologies has arisen. In response to this need, MPEG-A (MPEG Application: ISO/ICE 230000) multimedia application standardization activities have been carried out. In a multimedia application format (MAF) that is one of MPEG-A activities, non-MPEG standards as well as the conventional MPEG standards are also combined so that the utilization value of the standard can be enhanced. In this way, already verified standard technologies can be easily combined without any further efforts to set up a separate standard, thereby developing the MAF and maximizing the efficiency value thereof.

A technology of displaying a 3D image has been actively developed in order to display more realistic image information. A method of displaying a 3D image, which includes scanning a left view image and a right view image for respective corresponding locations of a conventional display device according to human visual characteristics, separating left and right views to correspond to left and right eyes of a viewer, and displaying an image as a 3D stereoscopic image is regarded as being applicable in various respects.

For example, a portable terminal, which is embedded with a barrier Liquid Crystal Display (LCD), reproduces stereoscopic content and provides a user with a more realistic image. In the present invention, the stereoscopic content includes 3D image data, which may be referred to as a stereoscopic file, or stereoscopic data. Also, the monoscopic content includes a 2D image data, which may be referred to as monoscopic data.

A general media file includes data regarding a single image, whereas the stereoscopic file includes left view image data and right view image data and information regarding a 3D display. However, a file format used to store and reproduce the stereoscopic file has not yet been standardized.

SUMMARY OF THE INVENTION

Accordingly, the present invention substantially solves the above-mentioned problems occurring in the prior art, and provides a file format used to store and reproduce a stereoscopic file based on an International Standardization Organization (ISO) based media file format, and an apparatus and method for generating the stereoscopic file having the file format.

In accordance with an aspect of the present invention, there is provided an apparatus for generating a stereoscopic file, the apparatus including an encoder encoding first video data and second video data that are included in 3D video data; and a file generating unit arranging the encoded first video data and second video data according to the information of a stereoscopic file format including boxes that are selected from boxes included in a conventional ISO based media file format in order to store and generate the stereoscopic file, and generating the stereoscopic file.

BRIEF DESCRIPTION OF THE DRAWINGS

The above and other aspects, features and advantages of the present invention will be more apparent from the following detailed description taken in conjunction with the accompanying drawings, in which:

FIG. 2 is a diagram of a stereoscopic file format according to an embodiment of the present invention;

FIG. 7 is a diagram of a stereoscopic file format according to another embodiment of the present invention.

DETAILED DESCRIPTION OF THE PREFERRED EMBODIMENTS

Hereinafter, preferred embodiments of the present invention will be described with reference to the accompanying drawings. In the following description, descriptions of known functions and configurations incorporated herein will be omitted when they may make the subject matter of the present invention rather unclear.

A stereoscopic file includes left view image data and right view image data and information regarding a three-dimensional (3D) display. However, a file format used to store and reproduce the stereoscopic file has not been standardized. It takes much time and effort to discuss a new standard or specification for defining a stereoscopic file format.

To address these problems, the present invention provides a stereoscopic file format based on a conventional media file format, and an apparatus and method for generating a stereoscopic file.

In more detail, the present invention provides a file format used to store and reproduce stereoscopic content based on an International Standardization Organization (ISO) based media file format.

Figure 1:
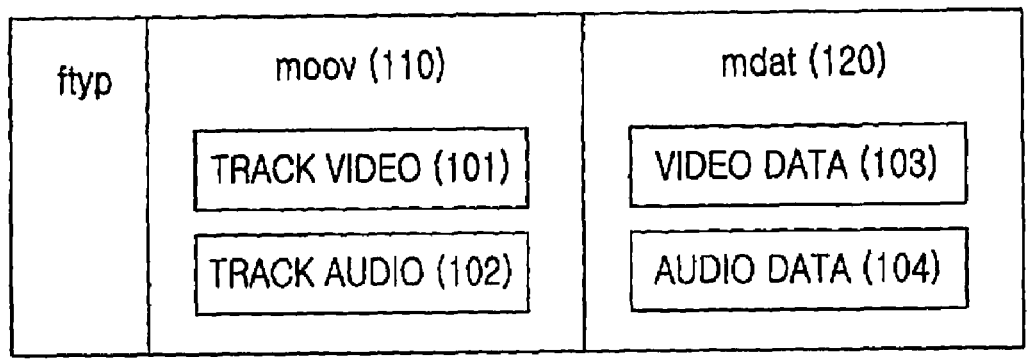
FIG. 1 is a diagram of a conventional International Standardization Organization (ISO) 14496-12 based two-dimensional (2D) image file format.

Before describing the stereoscopic file format of the present invention, a block of a two-dimensional (2D) image file format according to the conventional standard technology will now be described with reference to FIG. 1 which is a diagram of a conventional ISO 14496-12 based 2D image file format 100. Referring to FIG. 1, the conventional ISO 14496-12 based 2D image file format 100 includes a moov area 110 and an mdat area 120. The mdat area 120 is a media data area and includes video data 103 and audio data 104. The video data 103 and audio data 104 are stored in a frame unit. The moov area 110 is a header area and has an object based structure. The moov area 110 includes all pieces of information used to reproduce a file, including content information, such as a frame rate, a bit rate, image size, etc. and synchronization information used to support a reproduction function of FF/REW (fastforward/rewind), in particular, information regarding total frame number of the video data 103 and size of each frame, etc. A reproduction apparatus can reconstruct and reproduce the video data 103 and the audio data 104 by parsing the moov area 110 from among the file format.

The present invention selects and arranges necessary boxes from data boxes included in the conventional ISO 14496-12 based 2D image file format 100, so as to constitute a stereoscopic file format structure.

FIG. 2 shows a stereoscopic file format 300 according to an embodiment of the present invention. Referring to FIG. 2, the stereoscopic file format 300 includes boxes selected from the boxes included in a conventional ISO based media file format.

The ISO based media file format is a basic structure of a file format standardized by the Moving Picture Experts Group (MPEG) to store and reproduce multi-media used for various types of applications. For example, .mp4, .3gp, .3gp2, .k3g, .skm, etc. are multimedia file formats based on the basic structure of the ISO based media file format.

The definition of the boxes included in the ISO based media file format and syntax thereof are described in the ISO/IEC 14496-12 ISO based media file format, which can be obtained by one of ordinary skill in the art.

Referring to FIG. 2, the stereoscopic file format 300 has a hierarchical structure in the same manner as the conventional media file structure.

The stereoscopic file format 300 is defined by selecting and assembling boxes 301-343 which are necessary for storing and reproducing stereoscopic content from the boxes included in the conventional ISO based media file format. The boxes 301-343 have a hierarchical structure, and a brief description thereof will now be described below. The detailed description thereof refers to the ISO/IEC 14496-12 ISO based media file format.

An ftyp box 301 indicates a file type and compatibility.

A moov box 303 includes all metadata relating to media data.

A mvhd box 305 indicates a movie header.

A trak box 307 is a container for each track or stream.

A tkhd box 309 is a track header including general information regarding a track.

An mdia box 311 is a container for media data information included in a track.

An mdhd box 313 indicates a media header.

An hdlr box 315 is a handler defining the type of media.

An minf box 317 is a container for the media data information.

A vmhd box 319 includes video media header information.

An smhd box 321 includes sound media header information.

An hmhd box 323 includes hint media header information.

An nmhd box 325 includes Null media header information.

A dinf box 327 is a data information container.

A dref box 329 is a data reference box defining sources of media in a track.

An stbl box 331 is a sample table box.

An stsd box 333 is a sample description box for codec type information, initialization information, etc.

An stts box 335 indicates a decoding type of a sample.

An stsc box 337 is a sample-to-chunk box indicating a location where a sample bitstream is stored.

An stsz box 339 indicates bitstream sizes of samples.

An stco box 341 is a chunk offset box indicating where a sample bitstream is stored.

An mdat box 343 is a container including media data.

The stereoscopic file format 300 as shown in FIG. 2 defined by the present invention can be used to generate a stereoscopic content file having a variety of structures.

In the present embodiment, a newly defined value is used to indicate the structure of a stereoscopic content file. In this case, the value indicating the structure of the stereoscopic content file can be included in one of the boxes included in the stereoscopic file format 300.

Alternatively, in the present embodiment, a specific value of one of the boxes included in the stereoscopic file format 300 can be used to indicate the structure of the stereoscopic content file. For example, a major_brand syntax value defined in the ftyp box 301 can be used to indicate the structure of the stereoscopic content file.

In more detail, the major_brand syntax value defined in the ftyp box 301 is defined to indicate a ssc1 type and a ssc2 type so as to identify a piece of stereoscopic content having 1 elementary stream (ES) and another piece of stereoscopic content having 2 ESs as summarized in Table 1 below.

TABLE 1

| Type | Specification |
|------|---------------|
| 'ssc1' | Stereoscopic content with 1 ES (Elementary Stream) |
| 'ssc2' | Stereoscopic content with 2 ES (Elementary Stream) |

To be more specific, the ftyp box 301 included in the stereoscopic file format 300 is designed so that the major_brand syntax value can indicate the ssc1 type and the ssc2 type.

Therefore, when a reproducing apparatus reproduces a predetermined piece of stereoscopic content, the structure of the stereoscopic file format 300 can be determined according to the ssc1 type and the ssc2 type indicated by the major_brand syntax value of the ftyp box 301 included in the stereoscopic file format 300.

Figure 3:
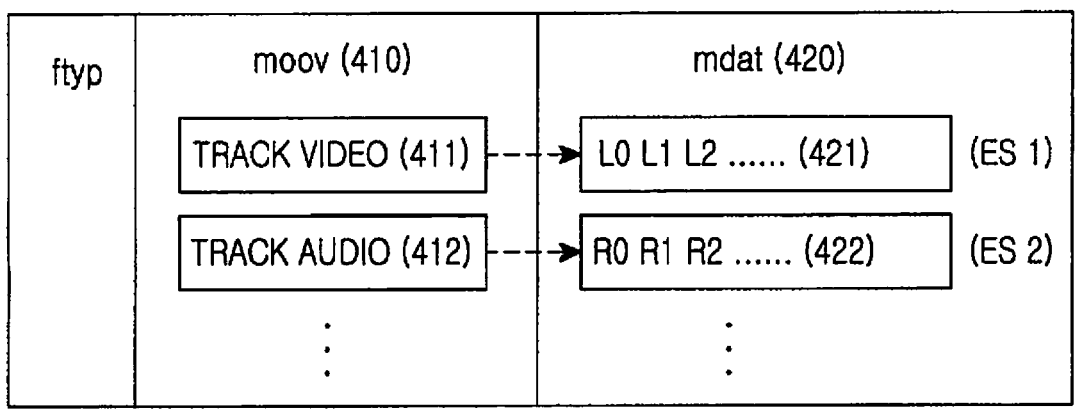
FIG. 3 is a diagram of a stereoscopic file format according to an embodiment of the present invention.

If the major_brand syntax value of the ftyp box 301 indicates the ssc2 type, the stereoscopic file format 300 has a file structure as shown in FIG. 3. If the major_brand syntax value of the ftyp box 301 indicates the ssc1 type, the stereoscopic file format 300 has a file structure as shown in FIG. 4.

FIG. 3 shows a stereoscopic file format 400 when the major_brand syntax value of the ftyp box 301 indicates the ssc2 type.

Referring to FIG. 3, the stereoscopic file format 400 has two ESs 421 and 422 respectively including a left view image and a right view image. Thus, a moov box 410 includes track headers 411 and 412 corresponding to the ESs 421 and 422, respectively.

Figure 4:
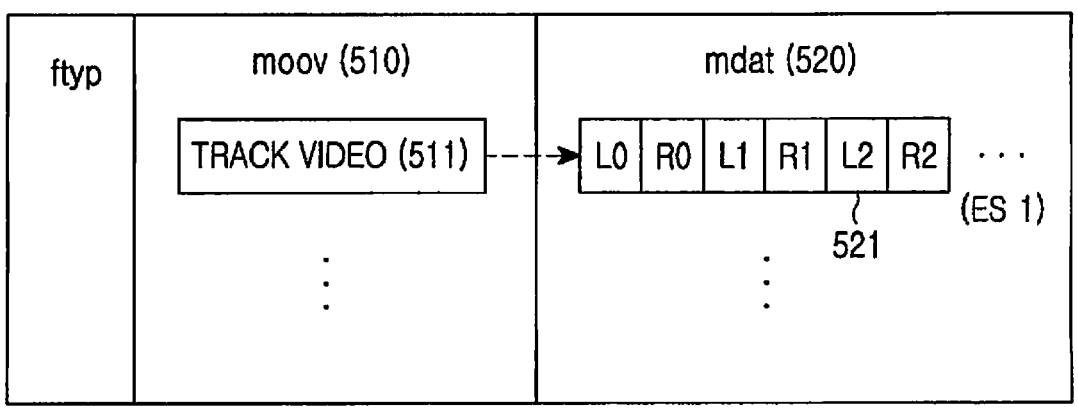
FIG. 4 is a diagram of a stereoscopic file format according to another embodiment of the present invention.

FIG. 4 shows a stereoscopic file format 500 when the major_brand syntax value of the ftyp box 301 indicates the ssc1 type.

Referring to FIG. 4, the stereoscopic file format 500 has an ES 521 in which samples or frames of left view video data and samples or frames of right view video data are interleaved in a frame unit and arranged.

An apparatus and method for generating a stereoscopic file by using the stereoscopic file format 300 will now be described.

Figure 5:
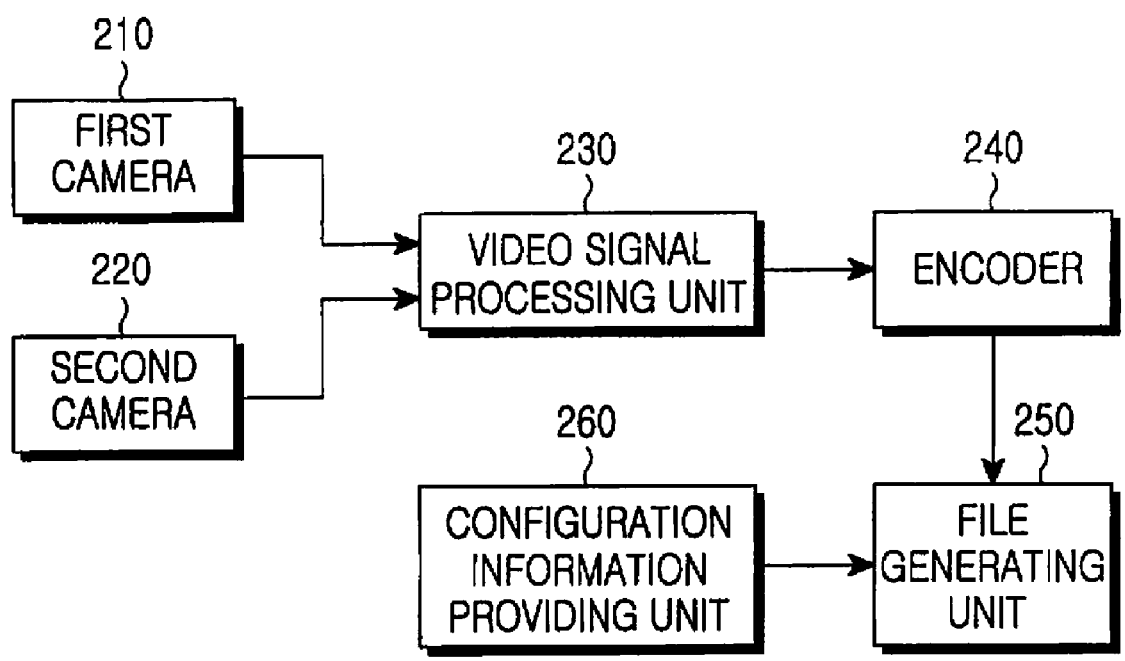
FIG. 5 is a block diagram of an apparatus for generating a stereoscopic file according to an embodiment of the present invention.

FIG. 5 shows an apparatus 200 for generating a stereoscopic file according to an embodiment of the present invention.

Referring to FIG. 5, the apparatus 200 for generating the stereoscopic file includes a first camera 210, a second camera 220, a video signal processing unit 230, an encoder 240, a file generating unit 250, and a configuration information providing unit 260.

The first camera 210 photographs a predetermined subject from a left view or a right view, and outputs first video data. The second camera 220 photographs the subject from another view different to that of the first camera 210, and outputs second video data.

The video signal processing unit 230 pre-processes the first and second video data output by the first camera 210 and the second camera 220. The pre-processing performed by the video signal processing unit 230 corresponds to conversion of an external image value, i.e., light and color components, that is an analog value recognized by a charge coupled device (CCD) or a complimentary metal-oxide semiconductor (CMOS) type sensor into a digital value.

The apparatus 200 for generating the stereoscopic file may further include a storage unit (not shown) that stores the first or second video data that is pre-processed by the video signal processing unit 230. Also, a storing device that functions as a buffer between the elements shown in FIG. 5 is not separately shown in the present embodiment. The encoder 240 encodes the first and second video data. The encoding performed by the encoder 240 includes compression of data, which can be skipped as occasion demands.

The file generating unit 250 generates the stereoscopic file by using the first and second video data encoded by the encoder 240. In this case, the file generating unit 250 receives configuration information indicating a stereoscopic file format of the present embodiment from the configuration information providing unit 260. The configuration information can be previously stored in the file generating unit 250. In this case, the configuration information providing unit 260 can be removed.

As described above, the stereoscopic file format of the present embodiment is the same as shown in FIG. 2, and is defined by selecting and assembling boxes 301-343 which are necessary for storing and reproducing stereoscopic content from the boxes included in the conventional ISO based media file format.

Meanwhile, the file generating unit 250 can have a structure in which the stereoscopic file includes one ES or two ESs.

In the present embodiment, a major_brand syntax defined in the ftyp box 301 can be used to constitute the structure of the stereoscopic file.

Figure 6:
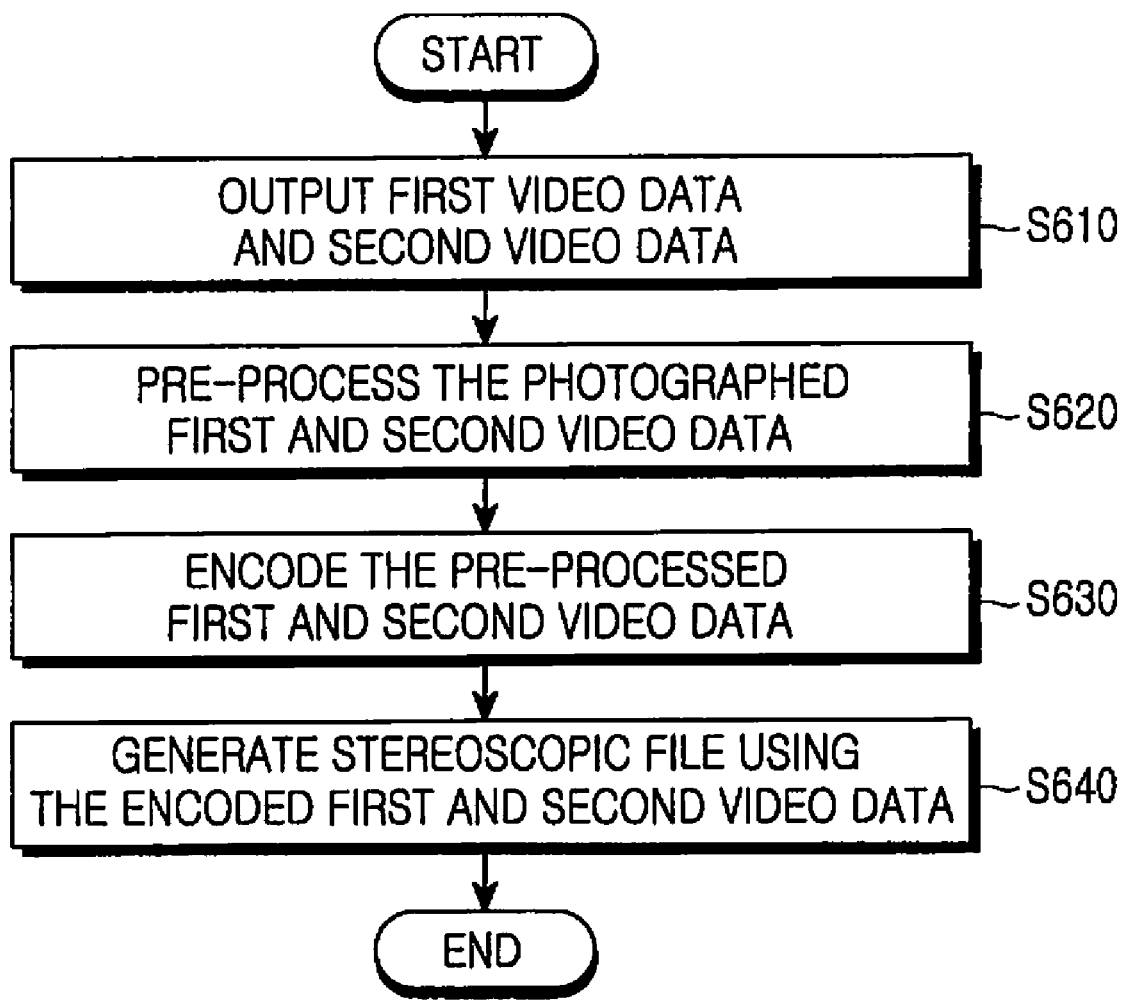
FIG. 6 is a flowchart of a method of generating a stereoscopic file according to an embodiment of the present invention.

FIG. 6 shows a method of generating a stereoscopic file according to the present invention. The method of FIG. 6 includes a photographing step S610, a pre-processing step S620, an encoding step S630, and a file generating step S640 operations.

In the photographing step S610, a predetermined subject is photographed from a left view or a right view, and first video data is output, and the predetermined subject is photographed from another view that is different to that of the first video data, and second video data is output.

In the pre-processing step S620, the first and second video data are pre-processed. In more detail, the first and second video data that are analog values recognized by a CCD or CMOS type sensor are converted into digital values.

In the encoding step S630, the pre-processed first and second video data are encoded, which can be skipped as occasion demands.

In the file generating step S640, the encoded first and second video data are used to generate the stereoscopic file, by selecting and assembling boxes 301-343 which are necessary for storing and reproducing stereoscopic content from the boxes included in the conventional ISO based media file format according to configuration information indicating the stereoscopic file format of the present embodiment.

The structure of the stereoscopic file can include one ES or two ESs. In the file generating step S640, a value indicating the structure of the stereoscopic file can be inserted into one of the boxes of the stereoscopic file format or a conventional value can indicate the structure of the stereoscopic file.

FIG. 7 shows a stereoscopic file format according to another embodiment of the present invention.

The stereoscopic file 400 is generated by arranging boxes that are selected from boxes included in a conventional ISO based media file format, as shown in FIG. 7.

One ES or two ESs generated by combining the stereoscopic content with the monoscopic content indicate a camera information related to each stereo fragment and display safety information, and a file format of the stereoscopic content including stereoscopic video media information.

The format of the stereoscopic file 400 shown in FIG. 7 is implemented by adding a box defined on the conventional ISO based media file format and boxes newly defined for necessary information, based on the file format shown in FIG. 2.

The brief description of boxes included in the file format shown in FIG. 7 is as follows.

An ftyp box 401 indicates a file type and compatibility.

A pdin box 403 includes information necessary to download a file.

A moov box 405 is a container for media data.

A mvhd box 407 indicates a movie header.

A trak box 409 is a container for each track or stream.

A tkhd box 411 is a track header including general information regarding a track.

A tref box 413 is a container for indicating a reference track.

An edts box 415 is an edit list container.

A elst box 417 is a box related to a presentation time line.

A mdia box 419 is a container for the media data information in a track.

An mdhd box 421 indicates a media header.

An hdlr box 423 is a handler defining the type of media.

An minf box 425 is a container for the media data information.

A vmhd box 427 includes video media header information.

An smhd box 429 includes sound media header information.

An hmhd box 431 includes hint media header information.

An nmhd box 433 includes Null media header information.

A dinf box 435 is a container for data information.

A dref box 437 is a data reference box defining sources of media in a track.

An stbl box 439 is a sample table box.

An stsd box 441 is a sample description box for codec type information, initialization information, etc.

An stts box 443 indicates a decoding type of a sample.

An stsc box 445 is a sample-to-chunk box indicating a location where a sample bitstream is stored.

An stsz box 447 indicates bitstream sizes of samples.

An stz2 box 449 indicates compact bitstream sizes of samples.

An stco box 451 is a chunk offset box indicating where a sample bitstream is stored.

A co64 box 453 is a chunk offset box represented by 64-bit.

An stss box 455 is a sync sample table box.

An ipmc box 457 is a control box related to content protection.

An mdat box 459 is a container including media data.

An meta box 461 is a container for storing additional metadata.

An hdlr box 463 is a handler for defining the type of metadata.

An iloc box 465 is a box specifying an item location.

An iinf box 467 is a box specifying item information.

An xml box 469 is a container for xml.

An bxml box 471 is a container for binary xml.

An scdi box 473 is a box for a stereoscopic camera and display safety information.

An svmi box 475 is a box for stereoscopic video media information.

Of the boxes shown in FIG. 7, all boxes except for the scdi box 473 and the svmi box 475 are defined in the ISO based media file format.

The definition, syntax, and semantics of the scdi box 473 are defined by Table 2 below.

TABLE 2

[Definition]
Box Type:   'scdi'
Container:   Meta Box('meta')
Mandatory:   Yes
Quantity:   Exantly one
[Syntax]
aligned(8) class StereoscopicCameraAndDisplayInformationBox extends
FullBox('scdi', version=0, 0)
{
  // stereoscopic camera information
  unsigned int(1) is_cam_params;
  unsigned int(7) reserved;
  if(is_cam_params)
  {
    unsigned int(32)    baseline;
    unsigned int(32)    focal_length;
    unsigned int(32)    covergence_distance;
    unsigned int(1)     is_camera_cross;
    unsigned int(7)     reserved;
    if(is_camera_cross)
    {
      unsigned int(32)    camera_rotation[ ];
    }
  }
  // stereoscopic display information
  unsigned int(1)  is_display_safety_info;
  unsigned int(7)  reserved;
  if(is_display_safety_info)
  {
    unsigned int(16)   viewing_distance;
    unsigned int(16)   display_size;
    int(16)            min_of_disparity;
    int(16)            max_of_disparity;
  }
}
[Semantics]
is_cam_params:   indicates if camera parameter information is included
baseline: distance between two cameras
focal_length:   distance from optical center to image plane
convergence_distance: distance from center of baseline to a convergence point
is_camera_cross:    defines arrangement of a camera (0: parallel arrangement, 1: cross arrangement)
camera_rotation: position angle of camera toward the object
is_display_safety_info: identifies if stereoscopic display information is included
viewing_distance: distance between a user and a display device TABLE 2-continued display_size: screen size of a display device
min_of_disparity: mininum disparity between left image and right image
max_of_disparity: maximun disparity between left image and right image The definition, syntax, and semantics of the svmi box 475 are defined by Table 3 below.

TABLE 3

[Definition]
Box Type:   'svmi'
Container: Meta Box('meta')
Mandatory:   Yes
Quantity:   Exactly on
[Syntax]
aligned(8)   class    StereoscopicVideoInformationBox    extends
FullBox('svmi', version = 0, 0)
//stereoscopic visual type information
unsigned int(8) stereoscopic_composition_type;
unsigned int(1) is_left_first;
unsigned int(7) reserved;
// stereoscopic fragment information
unsigned int(1) is_all_stereo;
unsigned int(7) reserved;
if(is_all_stereo == 0)
   unsigned int(1) is_main_media;
   unsigned int(7) reserved;
   unsigned int(32) entry_count;
     for(i=0; i<entry_count; i++)
        unsigned int(32) sample_count;
        unsigned int(8) stereo_flag;
[Semantics]
stereoscopic_composition_type:     type of frame composition of stereoscopic video content (0: side-by-side, 1: vertical line interleaved, 2: frame sequential, 3: monoscopic left image, 4: monoscopic right image)
   is_left_first: indicates which one of left image and right image is first encoded
   is_all_stereo: indicates if all fragments within ES are stereo fragments (0: mono, 1: stereo)
   is_main_media: indicates if monoscopic content within ES is main media (0: sub media, 1: main media)
   entry_count: the number of samples having successive values
   sample_count: the number of samples having successive values
   stereo_flag: indicates if current frame is stereo or mono (0: mono, 1:stereo)

In the present invention, it is possible to newly define and use a value indicating the file format of the stereoscopic content defined by assembling the stereoscopic data and the monoscopic data. In this case, the value may be included in one of the boxes included in the stereoscopic file format according to the present invention.

Alternatively, in the present invention, a specific value of one of the boxes defined in the conventional stereoscopic file format can be used to indicate the structure of the stereoscopic content file.

That is, the specific value is defined to indicate a ss01 type and a ss02 type so as to identify if a corresponding stereoscopic content includes either the assembly of the stereoscopic data and the monoscopic data, or the stereoscopic data as summarized in Table 4 below.

TABLE 4

| Types | Specifications |
|---|---|
| 'ss01 | Stereoscopic content without partial monoscopic data |
| 'ss02 | Stereoscopic content with partial monoscopic data |

For example, the values shown in Table 4 can be represented by using a brand identifier syntax value defined in the ftyp box 301 shown in Table 1.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for generating a stereoscopic file, the apparatus comprising:
   an encoder encoding first video data and second video data that are included in three-dimensional (3D) video data; and
   a file generating unit arranging the encoded first video data and second video data according to the information of a stereoscopic file format including boxes that are selected from boxes included in a conventional International Standardization Organization (ISO) based media file format in order to store in a memory and generate the stereoscopic file, and generating the stereoscopic file,
   wherein the stereoscopic file comprises a value indicating the structure thereof,
   wherein the value indicates one of a first type representing stereoscopic content with one elementary stream and a second type representing stereoscopic content with two elementary streams, and
   wherein the stereoscopic file includes an sedi box for stereoscopic camera and display safety information and a svmi box for stereoscopic video media information.

2. The apparatus of claim 1, wherein the stereoscopic file format has a structure defined by

| | | | | |
|---|---|---|---|---|
| ftyp | | | | file type and compatibility |
| moov | | | | container for all the metadata |
| | mvhd | | | movie header |
| | trak | | | container for an individual track or stream |
| | | tkhd | | track header |
| | | mdia | | container for media data information track |
| | | | mdhd | media header |
| | | | hdlr | handler, declares the media(handler)type |
| | | | minf | media information container |
| | | | vmhd | video media header |
| | | | smhd | sound media header |
| | | | hmhd | Null media header |
| | | | nmhd | data information box |
| | | | dinf | data reference box |
| | | | dref | hint media header |
| | | | stbl | sample description box |
| | | | stsd | sample descriptions |
| | | | stts | (decoding) time-to-sample |
| | | | stsc | Sample-to-chunk |
| | | | stsz | samples sizes |
| | | | stco | chunk offset |
| mdat | | | | media data container | wherein the ftyp box indicates a file type and compatibility, the moov box includes all metadata relating to media data, the mvhd box indicates a movie header the trak box is a container for each track of stream, the tkhd box is a track header including general information regarding a track, the mdia box is a container for media data information included in a track, the mdhd box indicates a media header, the hdlr box is a handler defining a type of media, the minf box is a container for the media data information, the vmhd box includes video media header information, the smhd box includes sound media header information, the hmhd box includes hint media header information, the nmhd box includes Null media header information, the dinf box is a data information container, the dref box is a data reference box defining sources of media in a track, the stbl box is a sample table box, the stsd box is a sample description box for information, the stts box indicates a decoding type of a sample, the stsc box is a sample-to-chunk box indicating a location where a sample bitstream is stored, the stsz box indicates bitstream sizes of samples, the stco box is a chunk offset box indicating where a sample bitstream is stored, and the mdat box is a container including media data.

3. The apparatus of claim 2, wherein the stereoscopic file comprises two elementary streams (ESs) each including left view video data and right view video data.

4. The apparatus of claim 2, wherein the stereoscopic file comprises an elementary stream (ES) in which samples or frames of the left view video data and samples or frames of the right view video data are interleaved in a frame unit and arranged.

5. The apparatus of claim 2, wherein the stereoscopic file has a structure for stereoscopic content including stereoscopic data.

6. The apparatus of claim 1, wherein the stereoscopic file format has a structure defined by

| | | | | |
|---|---|---|---|---|
| ftyp | | | | file type and compatibility |
| pdin | | | | Progressive download information |
| moov | | | | container for all the metadata |
| | mvhd | | | movie header |
| | trak | | | container for an individual track or stream |
| | | tkhd | | track header |
| | | tref | | track reference container |
| | | edts | | edit list container |
| | | | elst | an edit list |
| | | mdia | | container for media data information track |
| | | | mdhd | media header |
| | | | hdlr | handler, declares the media(handler)type |
| | | | minf | media information container |
| | | | vmhd | video media header |
| | | | smhd | sound media header |
| | | | hmhd | Null media header |
| | | | nmhd | data information box |
| | | | dinf | data reference box |
| | | | dref | hint media header |
| | | | stbl | sample description box |
| | | | stsd | sample descriptions |
| | | | stts | (decoding) time-to-sample |
| | | | stsc | Sample-to-chunk |
| | | | stsz | samples sizes |
| | | | stz2 | compact sample sizes |
| | | | stco | chunk offset, partical data-offset information |
| | | | co64 | 64-bit chunk offset |
| | | | stss | sync sample table (random access point) |
| | | | ipmc | IPMP Control Box |
| mdat | | | | media data container |
| meta | | | | metadata |
| | hdlr | | | handler, declares the media(handler)type |
| | iloc | | | item location |
| | iinf | | | item information |
| | xml | | | XML container |
| | bxml | | | binary XML container |
| | scdi | | | stereoscopic camera and display information |
| | svmi | | | stereoscopic video media information | wherein the ftyp box indicates a file type and compatibility, the pdin box includes information necessary to download a file, the moov box is a container for media data, the mvhd box indicates a movie header, the trak box is a container for each track or stream, the tkhd box is a track header including general information regarding a track, the tref box is a container for indicating a reference track, the edts box is an edit list container, the elst box is a box related to a presentation time line, the mdia box is a container for media data information included in a track, the mdhd box indicates a media header, the hdlr box is a handler defining a type of media, the minf box is a container for the media data information, the vmhd box includes video media header information, the smhd box includes sound media header information, the hmhd box includes hint media header information, the nmhd box includes Null media header information, the dinf box is a data information container, the dref box is a data reference box defining sources of media in a track, the stbl box is a sample table box, the stsd box is a sample description box for information, the stts box indicates a decoding type of a sample, the stsc box is a sample-to-chunk box indicating a location where a sample bitstream is stored, the stsz box indicates bitstream sizes of samples, the stz2 box indicates compact bitstream sizes of samples, the stco box is a chunk offset box indicating where a sample bitstream is stored, the co64 box is a chunk offset box represented by 64-bit, the stss box is a sync sample table box, the ipmc box is a control box related to content protection, the mdat box is a container including media data, the meta box is a container for storing additional metadata, the hdlr box is a handler box defining the type of metadata, the iloc box is a box specifying an item location, the iinf box is a box specifying item information, the xml box is a container for xml, the bxml box is a container for binary xml, the scdi box is a box for stereoscopic camera and display safety information, and the svmi box is a box for stereoscopic video media information.

7. The apparatus of claim 6, wherein the stereoscopic file has a structure for stereoscopic content defined by assembling stereoscopic data and monoscopic data.

8. A method generating a stereoscopic file, the method comprising:

encoding first video data and second video data that are included in three-dimensional (3D) video data; and arranging the encoded first video data and second video data according to the information of a stereoscopic file format including boxes that are selected from boxes included in a conventional International Standardization Organization (ISO) based media file format in order to store and generate the stereoscopic file, and generating the stereoscopic file, wherein the stereoscopic file comprises a value indicating the structure of the stereoscopic file, wherein the value indicates one of a type representing stereoscopic content with one elementary stream and a second type representing stereoscopic content with two elementary streams, and wherein the stereoscopic file includes an sedi box for stereoscopic camera and display safety information and a svmi box for stereoscopic video media information.

9. The method of claim 8, wherein the stereoscopic file format has a structure defined by

| | | | | | | |
|---|---|---|---|---|---|---|
| ftyp | | | | | | file type and compatibility |
| moov | | | | | | container for all the metadata |
| | mvhd | | | | | movie header |
| | trak | | | | | container for an individual track or stream |
| | | tkhd | | | | track header |
| | | mdia | | | | container for media data information track |
| | | | mdhd | | | media header |
| | | | hdlr | | | handler, declares the media(handler)type |
| | | | minf | | | media information container |
| | | | | vmhd | | video media header |
| | | | | smhd | | sound media header |
| | | | | hmhd | | Null media header |
| | | | | nmhd | | data information box |
| | | | | dinf | | data reference box |
| | | | | | dref | hint media header |
| | | | | stbl | | sample description box |
| | | | | | stsd | sample descriptions |
| | | | | | stts | (decoding) time-to-sample |
| | | | | | stsc | Sample-to-chunk |
| | | | | | stsz | samples sizes |
| | | | | | stco | chunk offset |
| mdat | | | | | | media data container | wherein the ftyp box indicates a file type and compatibility, the moov box includes all metadata relating to media data, the mvhd box indicates a movie header, the trak box is a container for each track or stream, the tkhd box is a track header including general information regarding a track, the mdia box is a container for media data information included in a track, the mdhd box indicates a media header, the hdlr box is a handler defining a type of media, the minf box is a container for the media data information, the vmhd box includes video media header information, the smhd box includes sound media header information, the hmhd box includes hint media header information, the nmhd box includes Null media header information, the dinf box is a data information container, the dref box is a data reference box defining sources of media in a track, the stbl box is a sample table box, the stsd box is a sample description box for information, the stts box indicates a decoding type of a sample, the stsc box is a sample-to-chunk box indicating a location where a sample bitstream is stored, the stsz box indicates bitstream sizes of samples, the stco box is a chunk offset box indicating where a sample bitstream is stored, and the mdat box is a container including media data.

10. The method of claim 8, wherein the stereoscopic file comprises two elementary streams (ESs) each including left view video data and right view video data.

11. The method of claim 8, wherein the stereoscopic file comprises an elementary stream (ES) in which samples or frames of the left view video data and samples or frames of the right view video data are interleaved in a frame unit and arranged.

12. The method of claim 8, wherein the stereoscopic file format has a structure defined by

| | | |
|---|---|---|
| ftyp | | file type and compatibility |
| pdin | | Progressive download information |
| moov | | container for all the metadata |
| | mvhd | movie header |

| | | | |
|---|---|---|---|
| trak | | | container for an individual track or stream |
| | tkhd | | track header |
| | tref | | track reference container |
| | edts | | edit list container |
| | | elst | an edit list |
| | mdia | | container for media data information track |
| | | mdhd | media header |
| | | hdlr | handler, declares the media(handler)type |
| | | minf | media information container |
| | | vmhd | video media header |
| | | smhd | sound media header |
| | | hmhd | Null media header |
| | | nmhd | data information box |
| | | dinf | data reference box |
| | | dref | hint media header |
| | | stbl | sample description box |
| | | stsd | sample descriptions |
| | | stts | (decoding) time-to-sample |
| | | stsc | Sample-to-chunk |
| | | stsz | samples sizes |
| | | stz2 | compact sample sizes |
| | | stco | chunk offset, partical data-offset information |
| | | co64 | 64-bit chunk offset |
| | | stss | sync sample table (random access point) |
| | ipmc | | IPMP Control Box |
| mdat | | | media data container |
| meta | | | metadata |
| | hdlr | | handler, declares the media(handler)type |
| | iloc | | item location |
| | iinf | | item information |
| | xml | | XML container |
| | bxml | | binary XML container |
| | scdi | | stereoscopic camera and display information |
| | svmi | | stereoscopic video media information | wherein the ftyp box indicates a file type and compatibility, the pdin box includes information necessary to download a file, the moov box is a container for media data, the mvhd box indicates a movie header, the trak box is a container for each track or stream, the tkhd box is a track header including general information regarding a track, the tref box is a container for indicating a reference track, the edts box is an edit list container, the elst box is a box related to a presentation time line, the mdia box is a container for media data information included in a track, the mdhd box indicates a media header, the hdlr box is a handler defining a type of media, the minf box is a container for the media data information, the vmhd box includes video media header information, the smhd box includes sound media header information, the hmhd box includes hint media header information, the nmhd box includes Null media header information, the dinf box is a data information container, the dref box is a data reference box defining sources of media in a track, the stbl box is a sample table box, the stsd box is a sample description box for information, the stts box indicates a decoding type of a sample, the stsc box is a sample-to-chunk box indicating a location where a sample bitstream is stored, the stsz box indicates bitstream sizes of samples, the stz2 box indicates compact bitstream sizes of samples, the stco box is a chunk offset box indicating where a sample bitstream is stored, the co64 box is a chunk offset box represented by 64-bit, the stss box is a sync sample table box, the ipmc box is a control box related to content protection, the mdat box is a container including media data, the meta box is a container for storing additional metadata, the hdlr box is a handler box defining the type of metadata, the iloc box is a box specifying an item location, the iinf box is a box specifying item information, the xml box is a container for xml, the bxml box is a container for binary xml, the scdi box is used for stereoscopic camera and display safety information, and the svmi box is used for stereoscopic video media information.

13. The method of claim 12, wherein the stereoscopic file has a structure for stereoscopic content defined by assembling stereoscopic data and monoscopic data.

14. The method of claim 12, wherein the stereoscopic file has a structure for stereoscopic content including stereoscopic data.

* * * * *

UNITED STATES PATENT AND TRADEMARK OFFICE
CERTIFICATE OF CORRECTION

| | | |
|---|---|---|
| PATENT NO. | : 8,400,497 B2 | |
| APPLICATION NO. | : 12/206443 | |
| DATED | : March 19, 2013 | |
| INVENTOR(S) | : Gun-Ill Lee et al. | |

It is certified that error appears in the above-identified patent and that said Letters Patent is hereby corrected as shown below:

In the Claims:

Claim 1, at Col. 9, line 27:

"wherein the stereoscopic file includes an sedi box for ste-"

should be

--wherein the stereoscopic file includes an scdi box for ste- --.

Claim 8, at Col. 11, line 65:

"wherein the stereoscopic file includes an sedi box for ste-"

should be

--wherein the stereoscopic file includes an scdi box for ste- --.

Signed and Sealed this
Thirtieth Day of July, 2013

Teresa Stanek Rea
*Acting Director of the United States Patent and Trademark Office*